2,602,681

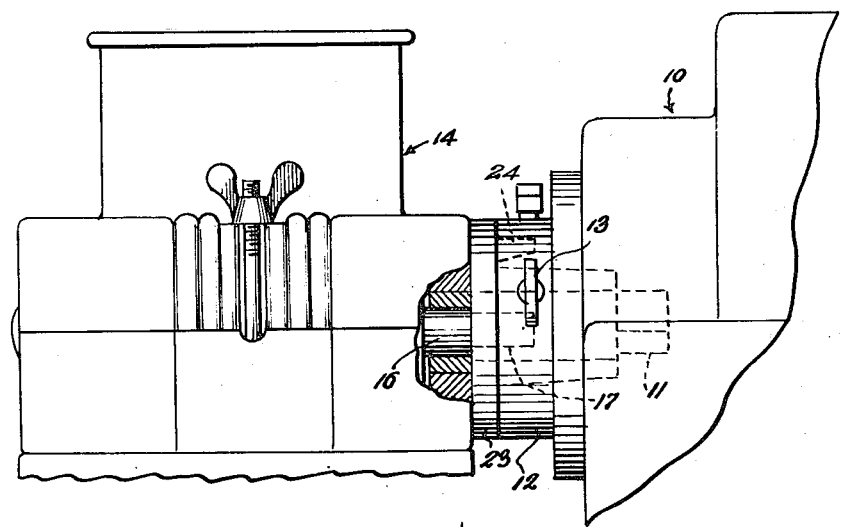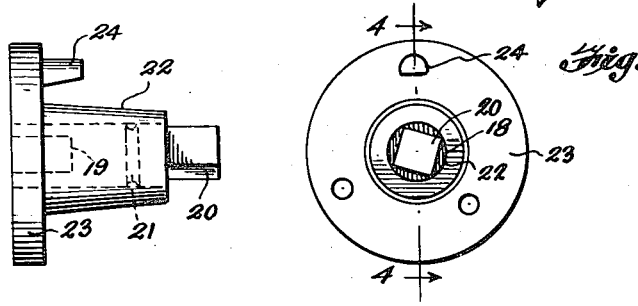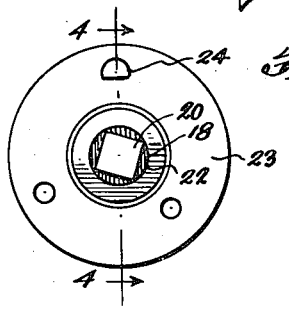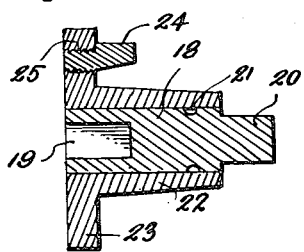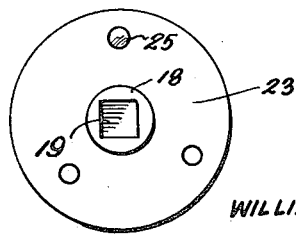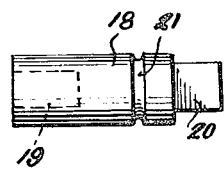
Inventor
WILLIAM B. BAILEY Patented July 8, 1952

UNITED STATES PATENT OFFICE 2,602,681

ADAPTER FOR CONNECTING MEAT TENDERIZERS TO FOOD CHOPPERS OR THE LIKE

William B. Bailey, Rockmart, Ga.

Application June 17, 1949, Serial No. 99,712

1 Claim. (Cl. 287—2)

The present invention relates to adapter for connecting a meat tenderizer to a food chopper or the like and it consists in the combinations, constructions and arrangements of parts herein described and claimed.

Generally there is provided a device which may be quickly and easily connected to a conventional food chopper so that the same may operate a meat tenderizer or a meat cuber and it comprises a cylindrical member having a squared socket formed in one end and having a squared projection formed in the other end thereof. It is further provided with a collar having an eccentrically mounted dog adapted to fit within an opening conventionally found within the collar of a food chopper.

It is accordingly an object of the invention to provide a device of the character set forth which is simple and inexpensive in construction, easily assembled and yet efficient and effective in use.

Another object of the invention is the provision of a device of the character set forth providing means whereby a food chopper of conventional construction may be quickly and easily connected to a meat tenderizer or the like.

A further object of the invention is the provision of a device of the character set forth having a minimum number of parts.

Other and further objects of the invention will become apparent from a reading of the following specification taken in conjunction with the drawing, in which:

Figure 1 is a side elevational view of an embodiment of the invention,

Figure 2 is a side elevational view of the device forming the invention per se,

Figure 3 is an end elevational view thereof,

Figure 4 is a sectional view taken along line 4—4 of Figure 3,

Figure 5 is a view similar to Figure 3 but taken from the opposite end thereof, and Figure 6 is a side elevational view of an element of the invention.

Referring more particularly to the drawing, there is shown therein a conventional food chopper, preferably of the motor powered type, generally indicated at 10 and provided with a conventional socket 11, retaining ring 12 and a set screw 13 mounted in the periphery of the retaining ring.

There is also illustrated generally at 14 a meat tenderizer or meat cuber which is provided with a shaft 16 having a squared projection 17 at its outer end.

The device forming the present invention comprises a cylindrical member 18 having a squared socket 19 formed in one end thereof and a squared projection 20 formed integrally at the other end thereof.

An annular groove 21 may be provided in the outer surface of the member 18 for the purposes of lubrication.

A tapered collar 22 is adapted to receive therein the cylindrical member 18 and is provided with an outwardly extending flange 23 at its larger end. A dog 24 is threadably mounted in the flange 23, as indicated at 25.

In operation, it will be apparent that the projection 17 is placed within the socket 19 and that the projection 20 is placed within the socket 11 and that the dog 24 will enter an opening 25 formed in one side of the ring 12 which is adapted to encompass the outer side of the collar 22 and to be clamped thereto by means of the set screw 13. The thus assembled devices will now, upon the operation of the food chopper 10 cause the corresponding operation of the food tenderizer or cuber 14, thus making it unnecessary for a butcher or grocer to provide himself with a separate machine for the purpose of cubing or tenderizing meat.

While but one form of the invention has been shown and described herein, it will be readily apparent to those skilled in the art that many minor modifications may be made without departing from the spirit of the invention or the scope of the appended claim.

What is claimed is:

In combination with a motor-powered device provided with a shaft having a squared socket in one end thereof and having a conventional retaining ring surrounding said shaft, said retaining ring having an eccentrically disposed lateral opening therein, the provision of a cylindrical member having a squared recess in one end thereof, an annular recess in the outer wall thereof and a squared projection on the other end thereof, said squared projection receivable in the socket in said shaft, a collar for receiving the cylindrical member, an annular ring formed integrally with said collar and a detent threadably connected to said ring and extending in a direction parallel to the cylindrical member and receivable in the eccentric opening in said retaining ring, said collar having a tapered outer wall and said ring being connected to the larger end of said collar.

WILLIAM B. BAILEY.

REFERENCES CITED

The following references are of record in the file of this patent:

UNITED STATES PATENTS

| Number | Name | Date |
|---|---|---|
| 917,412 | Claypoole | Apr. 6, 1909 |
| 968,280 | Stevens | Aug. 23, 1910 |
| 1,700,800 | Keyser | Feb. 5, 1929 |
| 2,404,017 | Wilkinson | July 16, 1946 |